United States Patent [19]
Vokes

[11] 3,877,648
[45] Apr. 15, 1975

[54] DEFIBERING APPARATUS INCLUDING MULTIPLE HORIZONTALLY SPACED COMMINUTING SURFACES

[75] Inventor: Robert F. Vokes, Franklin, Ohio

[73] Assignee: The Black Clawson Company, Middletown, Ohio

[22] Filed: Nov. 13, 1973

[21] Appl. No.: 415,298

[52] U.S. Cl. .................. 241/45; 162/261; 162/264; 241/46.17
[51] Int. Cl. ............................................ B02c 13/02
[58] Field of Search ........... 162/4, 20, 28, 261, 264, 162/234; 241/28, 29, 43, 46.11, 46.17; 241/298, 278

[56] References Cited
UNITED STATES PATENTS

| | | | |
|---|---|---|---|
| 1,621,571 | 3/1927 | Witz | 241/45 |
| 2,649,371 | 8/1953 | Reid | 162/261 |
| 2,681,598 | 6/1954 | Baxter, Jr. | 241/298 X |
| 3,073,535 | 1/1963 | Vokes | 241/46.11 |
| 3,342,425 | 9/1967 | Morton | 162/261 X |
| 3,547,357 | 12/1970 | Jonnson | 241/28 |
| 3,774,853 | 11/1973 | Seifert | 241/46.11 |

Primary Examiner—S. Leon Bashore
Assistant Examiner—Alfred D'Andrea, Jr.
Attorney, Agent, or Firm—Biebel, French & Bugg

[57] ABSTRACT

Defibering apparatus for the treatment of waste paper furnishes includes an enclosed tub or tank containing multiple rotors mounted on a common shaft and each provided with a cooperating bed plate. The primary defibering action is effected by the development of zones of intense hydraulic shear in such manner that plastic, wet-strength paper and similar material remains relatively intact while papers of lesser strength are separated into their fibrous constituents. The apparatus is constructed to permit bypassing of the rotors to the extent necessary to assure against damage in the event of the entry of tramp metal or other foreign objects.

10 Claims, 6 Drawing Figures

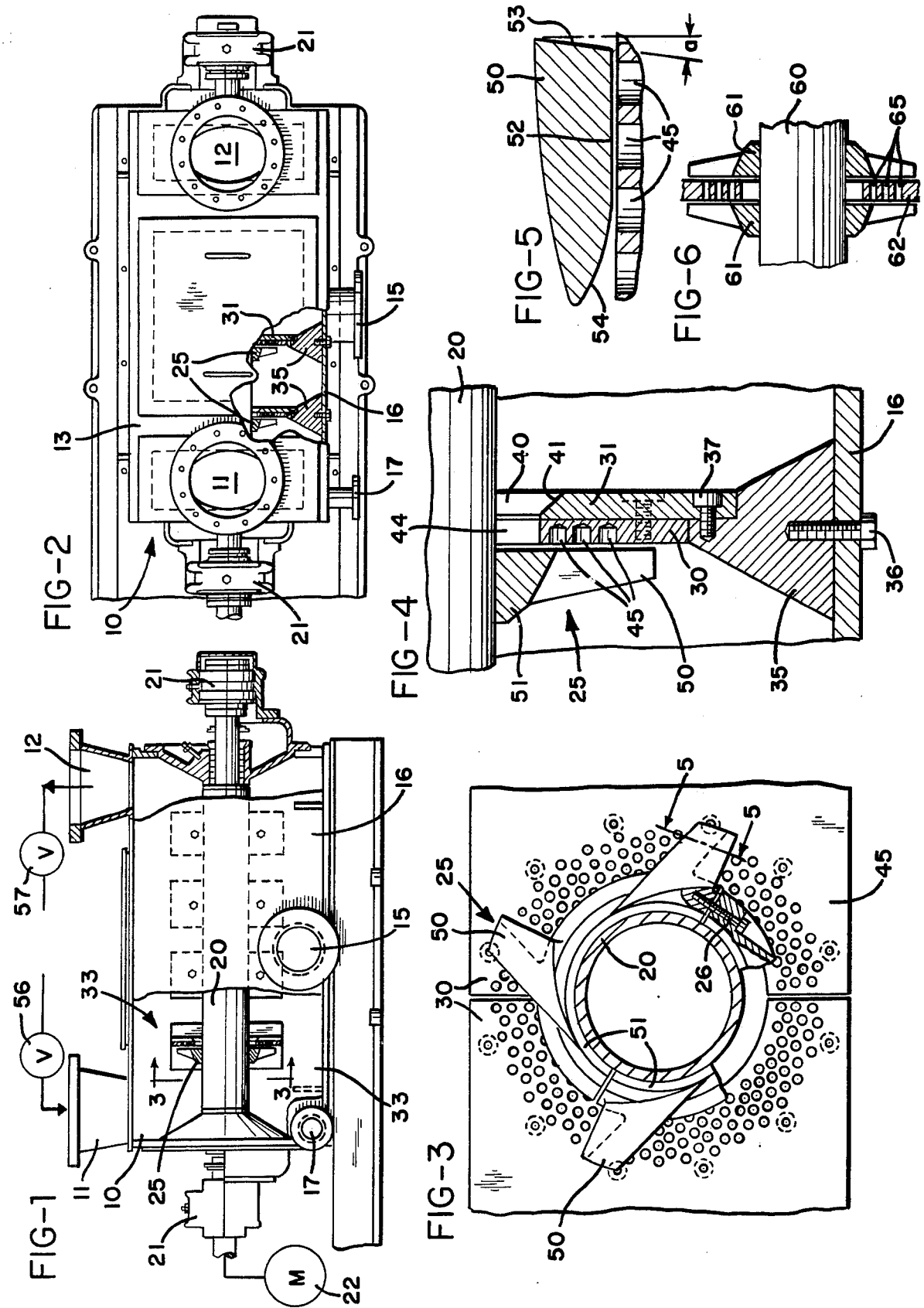

DEFIBERING APPARATUS INCLUDING MULTIPLE HORIZONTALLY SPACED COMMINUTING SURFACES

BACKGROUND OF THE INVENTION

The recently developing emphasis in the paper industry on the desirability of achieving optimum practical reuse of paper fiber by recycling waste paper materials has resulted in a need for new and improved apparatus for separating reusable paper fibers out of waste paper furnish contaminated with synthetic materials, plastic laminates, wet-strength papers, and the like.

More specifically, the industry has a need and demand for separating apparatus particularly for the treatment of waste paper, where the primary requirement is to supplement the action of a pulper in breaking down fiber clumps or flakes some of which are attached to or otherwise contaminated with plastic and other rejects without correspondingly reducing the particle sizes of the contaminated materials.

The primary object of the present invention is to provide apparatus which will satisfactorily fill the needs and demands outlined above, and more particularly to provide such apparatus which is not easily damaged by any hard foreign object entering it inadvertently with the furnish, and which also is substantially immune to plugging or clogging.

SUMMARY OF THE INVENTION

The invention has resulted in the provision of apparatus which is especially designed to effect separation of individual paper fibers from chunks and bundles of fiber and undefibered pieces of paper which are mixed with or attached to plastic and other contaminant materials without breaking down the contaminants, and therefore to make it practical to separate the paper fibers out by screening.

The invention is employed most effectively in the treatment of waste paper furnish which has already been subjected to preliminary defibering in a pulper and may also have been centrifugally cleaned sufficiently to remove metal, glass, and other high specific gravity contaminants. Such furnish, however, commonly still contains a substantial volume of relatively large pieces of plastic and other reject to which pieces of wet-strength and other paper are attached, as well as lumps and clumps of fiber intimately mixed with plastic reject.

Typical apparatus according to the invention comprises an enclosed tub or tank having ports adjacent each end thereof, one of which serves as an inlet port for attachment to a supply source of furnish under pressure, and the other of which is the discharge port. A shaft is mounted to extend throughout the length of the tub, and one or more rotors are mounted on this shaft for rotation in operative relationship with associated stationary bed plates as now further described.

Each of the rotors includes radially projecting vanes constructed and arranged to create a vortical pattern in the surrounding stock comprises a primarily radial (centrifugal) component and a minimum axial component, so that the rotors have minimum tendency to pump the stock axially of the shaft. The dwell time for a given volume of furnish is therefore controlled by the rate of flow through the chamber within the tub or tank, which is readily regulated by valves.

This mode of operation results in creation of an intense field of hydraulic shear in the stock surrounding the periphery of each rotor between the high velocity flow discharged from the tips of the rotor vanes, which typically travel at speeds in the range of 4000 to 6000 feet per minute, and the surrounding liquid which is held against rotation at such speeds by the rectangular, preferably square, cross-section of the tub. This is an important characteristic of the invention which provides selective disintegration of the relatively weak pieces of paper which enter this field, as compared with high wet-strength paper and plastic which are more readily screened out as larger pieces than as small particles, and which remain relatively intact in the apparatus of the invention.

In addition to the hydraulic shear forces just described, the bed plate associated with each rotor is provided with a working surface adjacent but in spaced relation with the rotor, so that the operation of the rotor tends to force stock through the clearance between this surface and rotor. In a preferred construction according to the invention, the working surface is defined by multiple holes in the bed plates into which lumps and pieces of mixed reject and fiber tend to be temporarily forced. The working action of the rotor is such as to apply tension to material caught in these holes which will have the effect of pulling apart relatively weak pieces of undefibered paper while leaving intact the plastic material caught in a hole, and then of pulling the plastic out of the hole for continued circulation in the tub. This action is repeated many times as the furnish travels from the inlet port of the tub to its outlet port.

The features noted in the preceding paragraph, and particularly the absence of pumping action, are emphasized by the fact that the invention comtemplates not only the provision of multiple rotors spaced along the shaft and all facing in the same direction, but also the use of multiple rotors arranged in back-to-back paired relation. Such an arrangement will result in neutralizing any pumping effect which the rotors might have, to assure that the dwell time of furnish in the apparatus and the effects of the apparatus thereon are entirely controlled by the rate at which the furnish is permitted to travel from the inlet port to the outlet port.

It is also a special feature of the invention that apparatus wherein it is embodied does not require a perforated plate or other means establishing a maximum particle size for the material discharged therefrom. In fact, the bed plates used in the practice of the invention are proportioned to leave passageways therepast by which material can bypass one or more of the rotors, so that relatively large pieces of reject material such as plastic can remain relatively large, and are therefore easy to screen on at a later processing stage, while the effective separation of fiber clumps, lumps and pieces is effectively performed.

The rectangular (square) shape of the tub contributes another important advantages to the invention in addition to retarding the rotational speed of the stock adjacent its walls. This is to redirect stock into the pattern created by the rotors and thereby to develop a more pronounced vortical configuration in that pattern, in a manner similar to the action of the baffles commonly employed in round tubs but without the necessity of using baffles.

BRIEF DESCRIPTION OF THE DRAWINGS

FIG. 1 is a view in side elevation, partly broken away, illustrating defibering apparatus in accordance with the invention;

FIG. 2 is a plan view, partly broken away, of the apparatus shown in FIG. 1;

FIG. 3 is an enlarged and partially fragmented section on the line 3—3 of FIG. 1;

FIG. 4 is an enlarged fragment of FIG. 2;

FIG. 5 is an enlarged fragmentary section on the line 5—5 of FIG. 3;

FIG. 6 is a fragmentary sectional view showing a modified construction.

DESCRIPTION OF THE PREFERRED EMBODIMENTS

The tub or tank 10 in FIGS. 1 and 2 is essentially rectangular in side elevation and plan and essentially square in cross section, and it includes ports 11 and 12 at opposite ends at the top wall 13 which function as inlet and outlet ports in operation. A centrally located port 15 at the bottom of one side wall 16 serves as a drain port, and a small port 17 at one corner is used to introduce wash water when the tub is being drained, or dilution water.

A shaft 20 of relatively large diameter, e.g. 6 inches, extends centrally of the tub through both end walls and is supported outside the ends of the tub by bearings 21. A drive for the shaft 20 is represented diagrammatically at 22. Shaft 20 has a plurality of rotors 25 mounted thereon in axially spaced relation, each rotor 25 comprising a pair of identical semi-circular portions which are secured together by screws 26 in clamping relation with shaft 20. Four of these rotors 25 are shown in FIG. 1, and each is provided with a cooperating bed plate assembly as now described.

Each bed plate assembly includes a bed plate 30 composed of a pair of identical half sections, and a support plate 31 which is proportioned to extend across the width of tub 10 but is substantially shorter in vertical dimension than the height of the tub 10 to leave passageways 33 above the below it in the tub. Each support plate 31 is mounted at opposite ends on the side walls of the tub by a bracket 35 of generally triangular section, each bracket being mounted on the adjacent side wall of the tub by screws 36, and the support plate being secured to its supporting brackets by screws 37. The center hole 40 in each support plate 31 which receives the shaft 20 therethrough is of substantially larger diameter than the shaft, e.g. 2 inches larger, and is chamfered at 41 on its side away from rotor 25.

The bed plate sections, which are mounted on the support plates 31 by screws 43, have cutouts in one edge which together define a center hole 44 for shaft 20 of the same diameter as the hole 40 in support plate 31. The bed plate 30 is also provided with a working surface on the side facing the adjacent rotor 25 which is formed by a pattern of multiple blind holes 45, i.e. holes which do not extend fully through the bed plate. As an example of dimensions found suitable under test, each hole 45 may have a diameter of approximately three-eighths inch and include a cylindrical outer portion approximately one-fourth inch deep, but the sizes and shapes of the holes, as well as the pattern of their distribution on the plate, are subject to considerable variation.

Each of the rotors 25 incorporates characteristics of the rotor disclosed in Vokes U.S. Pat. No. 3,073,535, in that each rotor includes a plurality of vanes 50 which project outwardly from the semi-circular hub portions 51, and which are constructed individually in substantially the same manner as in the Vokes patent. More specifically, each vane 50 has a substantially flat face 52 which is generally parallel with the adjacent surface of the bed plate 30, a leading edge surface 53 which is inclined toward the surface of the bed plate at an angle $a$ of the order of 5°, and a trailing edge portion 54 which curves away from the adjacent surface of the bed plate.

For preferred operating conditions, each rotor 25 should be mounted on shaft 20 in such adjusted relation with its cooperating bed plate 30 as to provide a definite clearance between the vane surface 52 and the working surface of the bed plate. The clamping mounting of each rotor on shaft 20 facilitates such adjustment in accordance with the characteristics of a particular type of furnish, and a typical range of clearance will extend from near contact to one-fourth inch, with one thirty-second inch being generally satisfactory. Additionally, the relative proportions of these parts for optimum results require that the radial dimension of each rotor vane 50 approximately match the radial dimension of the pattern of holes 45, so that the successive vanes will sweep over all of the working surface, but this relationship could be modified.

In the use of this apparatus, the port 11 will usually serve as the inlet port connected to a supply of stock under pressure, and the port 12 will then be the outlet port. Since this apparatus is especially designed for handling waste paper furnishes containing substantial quantities of reject plastic material, the stock will already have been partially defibered in a pulper, and it will usually have been sufficiently treated in centrifugal cleaning apparatus to remove high specific gravity contaminants, e.g. metal, glass etc. This stock, however, will still contain bundles of fiber, pieces of undefibered papers such particularly as wet-strength papers, and pieces of plastic to which undefibered paper or chunks of fiber are still adhered.

The apparatus of the invention is especially effective for treating stock of this character in such manner as to break up the bundles of fiber, defiber undefibered paper, and separate the paper fiber from the plastic without significant reduction of the partical size of the pieces of plastic. These results are accomplished because the forces applied to the stock by the apparatus of the invention are predominantly hydraulic shear forces, in the field surrounding the rotor, and there is only such mechanical action as results from contact between the rotor vanes and the solid particles in the stock. It is important on this point to recognize that the apparatus of this invention has minimal pumping effect upon the stock, the progression of stock from one port to the other and its dwell time in the tub being controlled by its rate of flow into the inlet port and from the outlet port, which is indicated in FIG. 1 as regulated by valves 56 and 57.

Considering more specifically the action which occurs within the tub 10, each of the rotors 25 creates a vortical pattern in the surrounding stock, but since the tub is entirely full of liquid, this pattern will include a primary radial component but a minimal axial component due to the rotor action. This absence of axial flow forces, plus the square cross-section of the tub, will tend to retard the stock near the walls of the tub against high speed rotational movement, as compared with the high velocity flow of stock in the annular space surrounding the rotor. One result of this condition will be the creation of a zone of high hydraulic shear wherein the desired defibering of weak (non-wet-strength) paper pieces will occur. In addition, the stock in the outer spaces near the wall will be redirected toward the flow pattern near the rotor for recirculation in a more pronounced vortical pattern, and this result is accomplished without the baffles commonly used for that purpose in round tubs.

The centrifugal flow forces created by each rotor will also induce stock to flow through the clearance between each rotor and its bed plate, and thus be subjected to the action of the working surface of the bed plate. Lumps and other pieces of plastic will tend to be caught temporarily in one or another of the holes 40, but the hydraulic forces created by rotation of the rotor will tend to pull individual fibers away from such pieces of plastic without disintegrating the plastic.

This action is due in part to the effect of the inclined leading face 53 of each rotor vane, which tends to force the stock in front of it toward the surface of the bed plate as well as centrifugally, and it is during this interval that pieces of this plastic will tend to be caught in a hole 45. Such pieces will be subjected to substantial hydraulic shear forces as the vane face 52 moves past them, and it is during this interval that the separation of weak paper flakes into fibers is most likely to occur. Then as the trailing edge part 54 of the rotor vane passes over each hole 45, it will create a suction force tending to empty successive holes 45 and thereby to return the plastic to the flow pattern. It should be noted, however, that other designs of rotors can also be used to create the desired primarily centrifugal flow pattern.

As stated, the dwell time for any given piece of solid material within the tub 10 will be controlled by the rate at which stock enters and leaves the respective inlet and outlet ports. Under the conditions described, it would be substantially impossible for any particle to escape subjection to some hydraulic action and possibly to some mechanical action, but the passageways 33 above and below the support plates 31 do make it possible for some material to bypass the rotors. More importantly, however, these passageways assure that the apparatus cannot clog, that substantially all solid material which enters through the inlet port will ultimately exit through the discharge port, and that if any foreign object, e.g. tramp metal, should enter the tub, it will drop to the bottom and cause no damage.

As already noted, it is not essential to the practice of the invention that the same ports always be used as inlet and outlet ports respectively, and tests have indicated that substantially the same results are obtained with either arrangement. It is also possible to change the size and number of rotor units from the specific arrangement shown in FIGS. 1–2. In any such modification, it is desirable to maintain the axial spacing between adjacent rotor units in the range of not less than one-half the diameter of one rotor.

Another possible modification of the apparatus of FIGS. 1–4 is to provide the rotors in paired back-to-back relation, with each rotor having its own bed plate mounted on a support plate common to the pair of bed plates. Such an arrangement is shown fragmentarily in FIG. 6, comprising a shaft 60, rotors 61, and a bed plate unit shown as a plate 62 having working surfaces on both sides thereof formed by a pattern of through holes 65. It will be understood that these working surfaces may duplicate those described in connection with FIGS. 3–5, and also that the plate 62 may have a composite assembly comprising a support plate and two sets of bed plate half-sections as described in connection with FIGS. 3 and 4, as well as that a bedplate with through holes like plate 62 could be used with a single rotor as in FIGS. 1–4. In such back-to-back rotor arrangement, the axial spacing between adjacent rotor units shall be greater than in the arrangement of FIGS. 1–4, namely in the range of at least one rotor diameter.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention.

I claim:

1. Defibering apparatus of the character described for the treatment of waste paper stock and the like, comprising:
    a. an elongated enclosed tub,
    b. means defining a port adjacent each end of said tub for respectively receiving and discharging stock under pressure,
    c. a drive shaft extending generally centrally through said tub from one end thereof to the other,
    d. a plurality of rotors mounted in axially spaced relation on said shaft,
    e. means defining a front and back face on each of said rotors,
    f. means forming an annular bed plate associated with each said rotor,
    g. means supporting each said bed plate adjacent the back face of the associated said rotor and in predetermined closely spaced relation therewith,
    h. said supporting means and each said bed plate being dimensioned to establish a passage for stock between at least one side edge thereof and the adjacent wall of said tub,
    i. means defining a working surface on each said bed plate on the side thereof adjacent the associated said rotor, and
    j. each said rotor including vane means constructed and arranged to create a vortical pattern in the stock on the front face thereof which includes a primarily centrifugal component inducing stock to travel between each of said rotors and its associated bed plate.

2. Defibering apparatus as defined in claim 1 wherein each said bed plate is imperforate.

3. Defibering apparatus as defined in claim 2 wherein said working surface comprises a plurality of blind holes on said adjacent surface of each said bed plate.

4. Defibering apparatus as defined in claim 1 wherein each said bed plate includes a central opening sufficiently larger than said shaft to define therewith an annular passageway for stock through said bed plate to said space between said working surface the associated said rotor.

5. Defibering apparatus as defined in claim 1 wherein said supporting means for each said bed plate includes a mounting plate secured at opposite ends to opposed walls of said tub, said mounting plate and said bed plate being of lesser dimensions than the distance between the other opposed walls of said tub to provide passageways for stock therepast adjacent said other walls of said tub.

6. Defibering apparatus as defined in claim 1 wherein each said rotor comprises two semi-circular parts and means securing said parts together in clamped relation with said shaft.

7. Defibering apparatus as defined in claim 1 wherein at least two of said rotors are arranged in back to back relation.

8. Defibering apparatus as defined in claim 1 wherein at least two of said rotors are arranged in back to back relation, wherein common plate means form said bed plates for said back to back rotors, and wherein said working surface includes a plurality of holes extending through said common plate means.

9. Defibering apparatus as defined in claim 8 wherein all of said rotors are arranged in paired back to back relation.

10. Defibering apparatus as defined in claim 1 wherein said tub is rectangular in radial section to cause stock adjacent the walls thereof to rotate about said shaft at a substantially lower rate than the stock in the annular space immediately surrounding each said rotor.

* * * * *